United States Patent
Saito et al.

(10) Patent No.: US 7,878,315 B2
(45) Date of Patent: Feb. 1, 2011

(54) SPRING CLUTCH

(75) Inventors: Takahide Saito, Iwata (JP); Masafumi Nakakoji, Iwata (JP); Katsumi Furutani, Iwata (JP); Koji Akiyoshi, Iwata (JP); Tomoaki Makino, Iwata (JP)

(73) Assignee: NTN Corporation, Osaka (JP)

( * ) Notice: Subject to any disclaimer, the term of this patent is extended or adjusted under 35 U.S.C. 154(b) by 750 days.

(21) Appl. No.: 11/783,697

(22) Filed: Apr. 11, 2007

(65) Prior Publication Data

US 2007/0240964 A1     Oct. 18, 2007

(30) Foreign Application Priority Data

| Apr. 14, 2006 | (JP) | ............................. 2006-111715 |
| May 24, 2006 | (JP) | ............................. 2006-144278 |
| Jul. 18, 2006 | (JP) | ............................. 2006-195598 |
| Jul. 20, 2006 | (JP) | ............................. 2006-198293 |
| Jul. 20, 2006 | (JP) | ............................. 2006-198421 |
| Mar. 22, 2007 | (JP) | ............................. 2007-073833 |

(51) Int. Cl.
    *F16D 41/20*      (2006.01)

(52) U.S. Cl. ................. 192/41 S; 192/75; 192/107 T; 474/74

(58) Field of Classification Search ............. None
See application file for complete search history.

(56) References Cited

U.S. PATENT DOCUMENTS

| 5,156,573 | A | * | 10/1992 | Bytzek et al. | ................. 474/74 |
| 5,165,507 | A | * | 11/1992 | Ohshima | .................... 188/290 |
| 5,211,269 | A | * | 5/1993 | Ohshima | .................... 188/290 |
| 5,749,449 | A | * | 5/1998 | Kearney et al. | ............. 192/41 S |
| 6,761,656 | B2 | * | 7/2004 | King et al. | .................... 474/74 |
| 7,191,880 | B2 | * | 3/2007 | Liston et al. | ............... 192/41 S |
| 7,618,337 | B2 | * | 11/2009 | Jansen et al. | .................... 474/74 |

FOREIGN PATENT DOCUMENTS

| JP | 2003-322174 | 11/2003 |
| WO | WO 2004011818 A1 * | 2/2004 |

* cited by examiner

*Primary Examiner*—David D Le
*Assistant Examiner*—Ryan Dodd
(74) *Attorney, Agent, or Firm*—Wenderoth, Lind & Ponack, LLP.

(57) ABSTRACT

A spring clutch is provided for which durability is improved by preventing a clutch spring from breaking due to fatigue. A cylindrical clutch spring made from a wire having a square section is mounted between a pulley and a pulley hub mounted in the pulley. An end of the clutch spring is coupled to the pulley hub. A clutch surface is formed on the inner periphery of the pulley and is formed with a large-diameter recess at a position opposite to the end portion of the clutch spring including the torque transmission end. When the pulley rotates in one direction, the clutch spring expands. At this time, the end portion of the clutch spring including the torque transmission end expands in the large-diameter recess, thus relaxing sharp torque produced in the clutch. This prevents local stress concentration on the clutch spring and breakage of the clutch spring and improves the durability of the clutch.

6 Claims, 15 Drawing Sheets

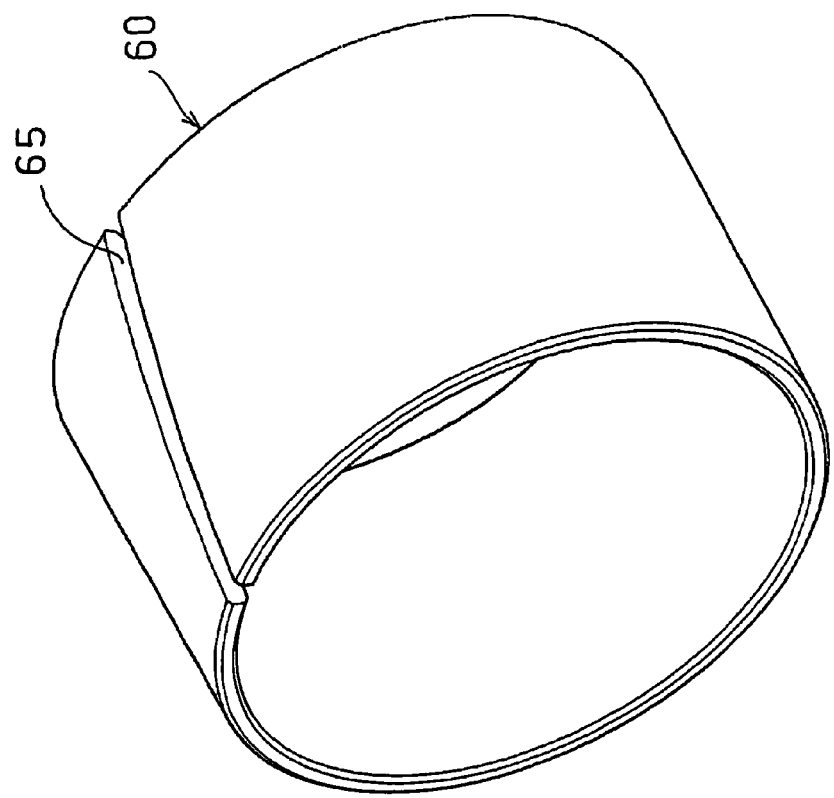
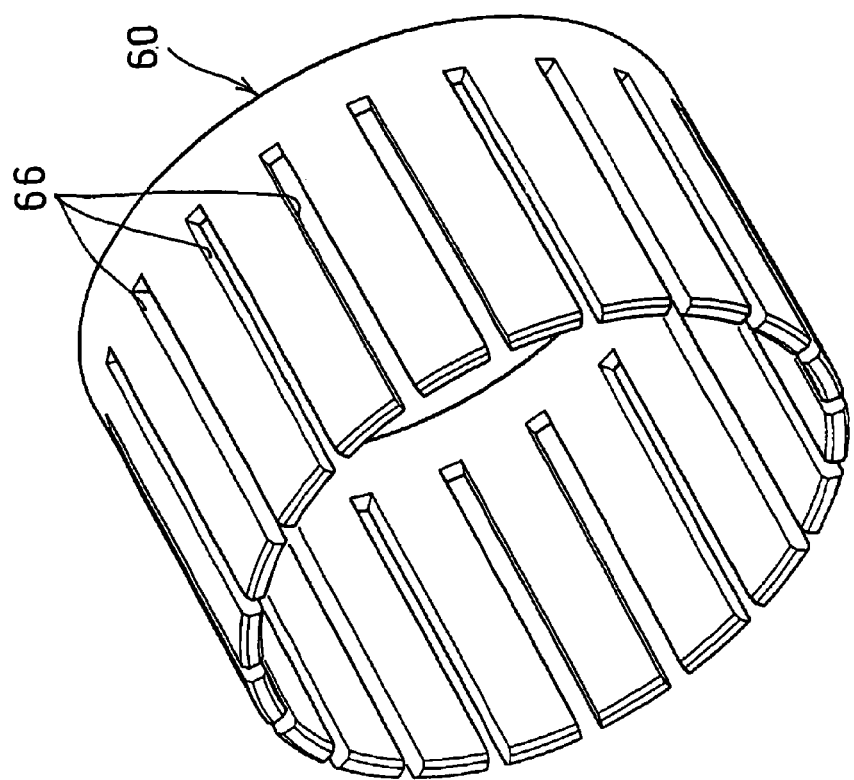

SPRING CLUTCH

BACKGROUND OF THE INVENTION

The present invention relates to a spring clutch comprising a clutch spring in the form of a coil spring mounted between an input member and an output member for transmitting the rotation of the input member in one direction to the output member and cutting off the transmission of rotation if the rotating speed of the output member exceeds the rotating speed of the input member.

Generally, with an engine accessory driving apparatus for transmitting the rotation of the crankshaft of an engine to rotary shafts of engine accessories through a belt transmission, if the engine is decelerated quickly, a pulley mounted on the rotary shaft of each engine accessory also tends to decelerate quickly. Especially in the case of an alternator, because the rotary shaft of the alternator has a large inertia, it cannot decelerate quickly in response to quick deceleration of the engine, so that the pulley mounted on the rotary shaft tends to continue to rotate at a constant speed.

In this state, there occurs a big difference between the speed of the pulley on the crankshaft and that of the pulley on the rotary shaft of the alternator, so that the belt tension increases and the belt becomes liable to break.

Also, the angular speed of the crankshaft changes in one turn. Such a change in angular speed causes slip between the belt and the pulleys, thus causing fatigue of the belt and impairing its durability.

Japanese patent publication 2003-322174A proposes a clutch pulley device which is free of this problem.

In this clutch pulley device, a cylindrical clutch spring made of a wire having a square section is mounted between a pulley and a pulley hub mounted in the pulley. The clutch spring has its outer periphery in elastic contact with a cylindrical clutch surface formed on the inner periphery of the pulley and has one end thereof in engagement with the pulley hub. When the pulley rotates in one direction, the clutch spring expands and increases the engaging force to the clutch surface, so that the rotation of the pulley is transmitted to the pulley hub through the clutch spring.

When the speed of the pulley hub exceeds the speed of the pulley, the clutch spring is radially compressed, causing slip between the clutch surface of the pulley and the clutch spring, so that the pulley can rotate freely.

With the clutch pulley device of Patent publication 2003-322174, since one end of the clutch spring is inserted and engaged in a spiral groove formed in one end of the pulley hub, a gap is formed between the outer periphery of the portion of the clutch spring and the clutch surface formed on the inner periphery of the pulley outside of the inlet of the spiral groove.

Therefore, in the deformation mode of the clutch spring in torque transmission, a bend is formed at a portion of the clutch spring corresponding to the inlet of the spiral groove and stress concentrates at the bend during torque input.

As a result, the clutch spring can break at its bend due to fatigue after repetition of loading of torque. This was a problem to be solved to improve durability.

An object of the present invention is to provide a spring clutch which has its durability improved by preventing the clutch spring from breaking due to fatigue.

SUMMARY OF THE INVENTION

According to the present invention, there is provided a spring clutch comprising an input member having a cylindrical clutch surface on its inner periphery, an output member mounted in the input member so as to be rotatable relative to the input member, and a cylindrical clutch spring mounted between the input member and the output member and including a torque transmission end through which torque is transmitted to the output member, wherein when the input member rotates in one direction, the clutch spring radially expands by contact with the clutch surface, thereby transmitting torque from the input member to the output member, and when the speed of the output member exceeds the speed of the input member, the clutch spring is radially compressed, thereby cutting off the transmission of torque from the input member to the output member, and wherein the clutch surface is formed with at least one large-diameter recess to allow radial expansion of several turns of the clutch spring.

By forming the large-diameter recess only at a position opposite to the end portion of the clutch spring including the torque transmission end, the clutch spring can be smoothly mounted in the clutch surface without getting caught.

In this arrangement, by forming the clutch surface with at least one large-diameter recess, when the input member rotates in one direction relative to the output member and the clutch spring expands, several turns of the clutch spring opposite to the large-diameter recess expand, but are not pressed against the clutch surface. Therefore, sharp torque input produced by the clutch is relaxed by elastic deformation of the coil portion and no breakage of the clutch spring will occur. Thus a highly durable spring clutch is provided.

In another embodiment of this invention, the clutch spring has at least one small-diameter portion which is not brought into pressed engagement with the clutch surface when the clutch spring expands.

If the small-diameter portion is formed only at a position opposite to the torque transmission end of the clutch spring, the clutch spring can be smoothly mounted in the clutch surface without getting caught.

In this arrangement, by providing the clutch spring with the small-diameter portion, when the input member rotates in one direction relative to the output member and the clutch spring expands, the small-diameter portion expands, but is not pressed against the clutch surface into engagement. Thus, sharp torque input is relaxed so that breakage of the clutch spring is prevented and thus the durability of the spring clutch can be improved.

In another arrangement, the clutch surface is formed with a large-diameter recess at a position opposite to the end portion of the clutch spring including the torque transmission end to allow expansion of several turns of the clutch spring at its portion including the torque transmission end, and the clutch spring comprises a clutch portion disposed radially opposite to a portion of the clutch surface other than the large-diameter recess, and a damper portion disposed radially opposite to the large-diameter recess, the clutch portion having a smaller spring rigidity than the damper portion.

In this arrangement, the clutch spring may be made from either a wire having a round section or a square section. But, with a clutch spring made from a wire having a round section, when the outer periphery of the clutch spring engages the clutch surface, the engaging surface would be liable to be damaged due to high surface pressure. Thus it is preferable to use a clutch spring made from a wire having a square section.

With a clutch spring made from a wire having a square section, it is possible to make the spring rigidity of the clutch portion and that of the damper portion different from each other by making different the thicknesses of wires from which the clutch portion and the damper portion are made. One method of making them different is by forming a coil spring from a wire having a square section and turning the inner periphery of the coil spring.

The spring rigidity of the clutch portion may be uniform over the entire axial length or may increase toward the damper portion in steps or continuously.

If the spring rigidity of the clutch portion is made smaller than that of the damper portion by changing the thickness of the wire by cutting, stress would concentrate at a portion where the thickness of the wire changes sharply.

Therefore, it is possible to relax concentration of stress by changing the spring rigidity of the clutch portion so as to gradually increase toward the damper portion in steps or continuously.

According to another embodiment of this invention, the clutch surface is formed with a large-diameter recess at a position opposite to the end portion of the clutch spring including the torque transmission end, and a cover ring is mounted in the large-diameter recess to cover this end portion of the clutch spring. The cover ring comprises an annular portion covering the torque transmission end of the clutch spring and a plurality of hold-down claws extending axially from one end of the annular portion for restraining expansion of the clutch spring with sufficient spaces left between the adjacent ones of the hold-down claws to allow elastic deformation of the clutch spring.

By forming the clutch surface with a large-diameter recess, when the input member rotates in one direction relative to the output member and the clutch spring expands, the damper portion of the clutch spring expands, but is not pressed against the clutch surface. Thus, elastic deformation by expansion of the damper portion relaxes sharp torque input. Therefore, it is not probable that the clutch spring bends at the damper portion and stress concentrates at the bend. Thus a highly durable spring clutch can be provided.

Also, by making the spring rigidity of the clutch portion smaller than that of the damper portion, change in the idling torque with change in the outer diameter of the clutch portion is small and the idling torque can be set at a small value. Thus, wear by friction during idling and heat buildup can be suppressed and the life of the clutch function unit can be increased.

The hold-down claws may be in a V shape having a width increasing toward the annular portion. With this arrangement, the spaces between the claws are the largest at their tip and decrease gradually toward the annular portion. Thus, the amount of deformation of the clutch spring between the adjacent claws becomes smaller toward the torque transmission side end of the clutch spring.

This arrangement makes it possible to increase the spring rigidity of the torque output end of the clutch spring gradually toward its one end, and prevent the breakage of the clutch spring effectively and relax the torque input loaded to the clutch spring.

In this arrangement, by mounting the cover ring in the large-diameter recess of the clutch surface so as to cover the end portion of the clutch spring including the torque transmission end and forming the cover ring with a plurality of hold-down claws, it is possible to increase the spring rigidity of the torque output end of the clutch spring. This makes it possible to adopt as the clutch spring one made from a spring material which is thin, apt to deform elastically and has good adherence to the clutch surface, thereby improving the operability of the spring clutch.

Also, when the clutch spring expands into clutch engagement with the clutch surface, several turns of the clutch spring at its portion including the torque transmission end is prevented from expanding at their portions opposite to the hold-down claws of the cover ring, so that the spring rigidity increases, and at their portions opposite to the spaces between the hold-down claws, the several turns of the clutch spring elastically deform and bulge radially outwardly, thereby relieving sharp torque input produced by the clutch. Therefore, no breakage of the clutch spring will occur and a highly durable spring clutch can be obtained.

According to another embodiment of this invention, a radially elastically deformable elastic ring is mounted in the large-diameter recess to supplement the spring rigidity of the end portion of the clutch spring including the torque transmission end.

The elastic ring may comprise a cylindrical body formed with a cut at a portion of its circumference or may comprise an annular portion having a plurality of elastic legs extending axially from one end of the annular portion with spaces between the adjacent ones of the annular legs.

A gap is formed between the outer periphery of the elastic ring and the inner periphery of the large-diameter recess and the gap is of such a size that even if the elastic ring expands under the maximum torque (allowable maximum torque to the spring clutch) loaded to the input member, the outer periphery of the elastic ring is kept out of contact with the inner periphery of the large-diameter recess. This prevents the spring clutch from being loaded with shock and prevents it from breakage.

In this arrangement, by mounting the elastic ring in the large-diameter recess of the clutch surface, the spring rigidity of the end portion of the clutch spring including the torque transmission end can be increased. This makes it possible to adopt as the clutch spring one made from a spring material which is thin, apt to deform elastically and has good adherence to the clutch surface, thereby improving the operability of the spring clutch.

According to a further embodiment of this invention, a ring member is mounted between the clutch surface and the clutch spring so as to get into elastic contact with the clutch spring, and a cylindrical elastic member is mounted between the ring member and the clutch surface so as to come into elastic contact with the outer periphery of the ring member and the clutch surface.

The ring member may be highly rigid and not elastically deformable or may be elastically deformable. The use of an elastically deformable ring member increases the percentage of absorption of excessive torque by elastic deformation of both the ring member and the elastic member. Thus, an excessive torque can be absorbed more effectively in comparison with the arrangement in which it is absorbed by elastic deformation of the elastic member only.

In this embodiment, by providing the ring member between the clutch surface and the clutch spring so as to be brought into elastic contact with the clutch spring, it is possible to make uniform the radial force of the clutch spring and ensure stable transmission of torque.

By providing the cylindrical elastic member between the ring member and the clutch surface so as to get into elastic contact with the outer periphery of the ring member and the clutch surface, if an excessive torque (shock torque) over the transmitted torque capacity is loaded by friction between the ring member and the elastic member, slip occurs at contact point between the ring member and the elastic member, so that torque transmission to the clutch spring is cut off. This prevents stress concentration to the torque transmission side end of the clutch spring and prevents breakage. Thus a highly durable spring clutch can be obtained.

BRIEF DESCRIPTION OF THE DRAWINGS

Other features and objects of the present invention will become apparent from the following description made with reference to the accompanying drawings, in which:

FIGS. 23A and 23B are perspective views of other two different ring members.

DETAILED DESCRIPTION OF THE PREFERRED EMBODIMENTS

Figure 1:
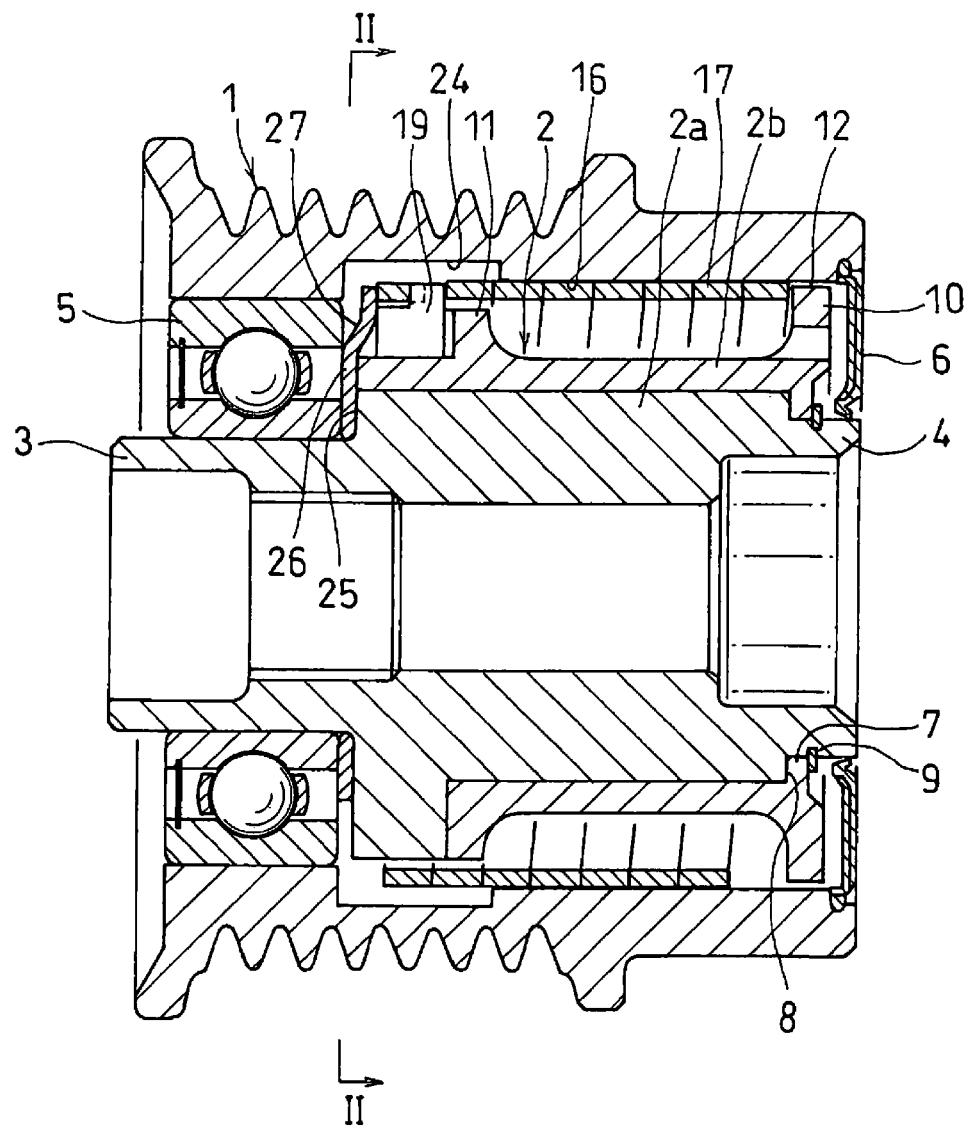
FIG. 1 is a vertical sectional front view of a spring clutch according to a first embodiment of this invention.
Figure 2:
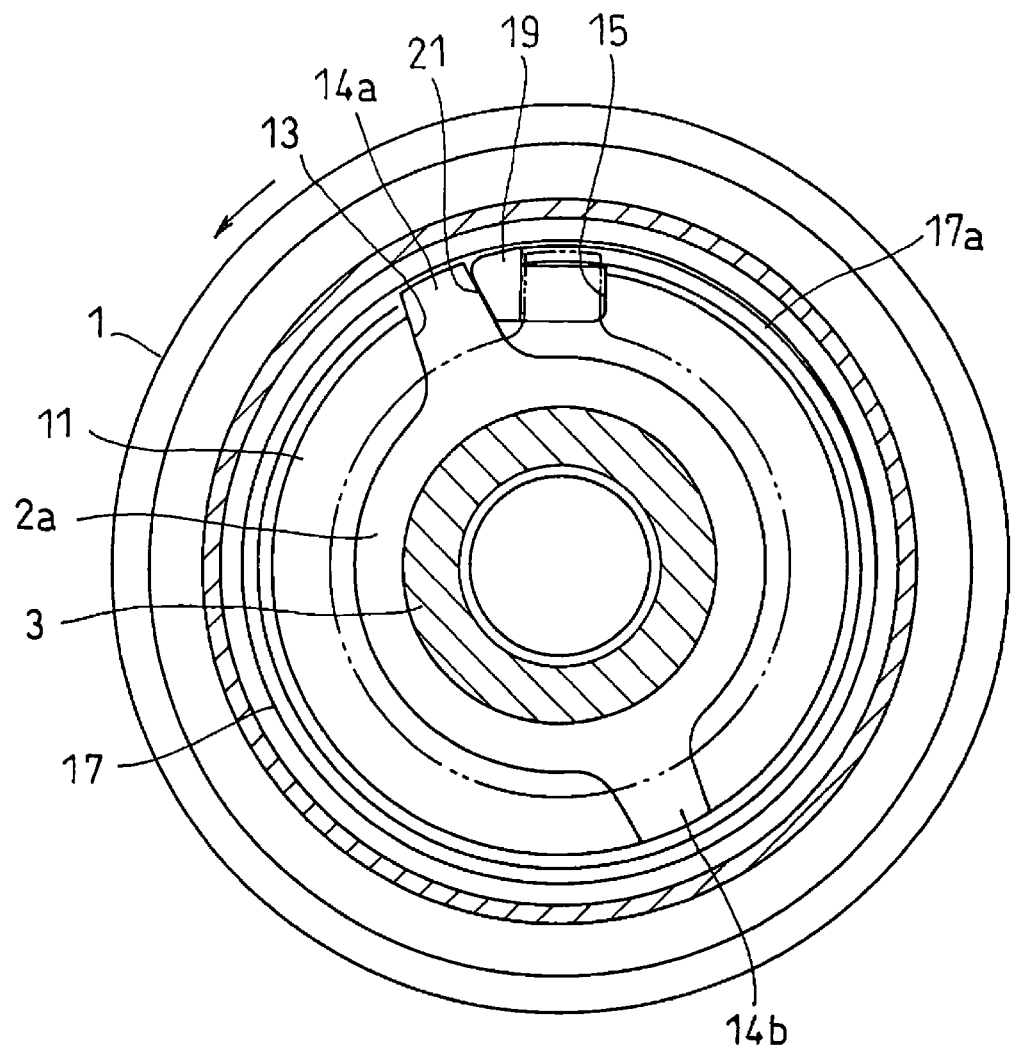
FIG. 2 is a sectional view taken along line II-II of FIG. 1.
Figure 3:
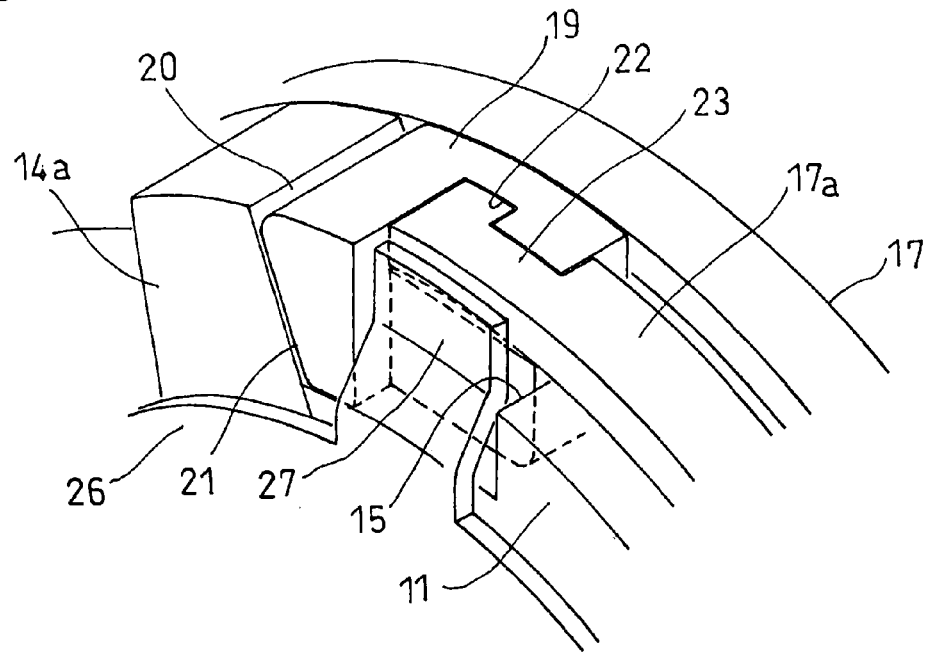
FIG. 3 is a partial enlarged perspective view thereof, showing how a clutch spring is coupled with a pulley hub.

The embodiments of the present invention are described below with reference to the accompanying drawings. FIGS. 1 to 3 show a spring clutch according to the first embodiment of the present invention. As shown in FIG. 1, the spring clutch includes a pulley 1 as an input member, and a pulley hub 2 as an output member mounted in the pulley 1.

The pulley hub 2 comprises an output shaft 2a made of a metal and a sleeve 2b mounted around the output shaft 2a. The output shaft 2a has an opposed pair of small-diameter portions 3 and 4 at both ends thereof. Between the small-diameter portion 3 at one end of the output shaft 2a and the corresponding end of the pulley 1, a single-seal bearing 5 is mounted to support the pulley 1 and the pulley hub 2 so as to be rotatable relative to each other.

At the other end of the pulley 1, a seal 6 is mounted between the pulley 1 and the output shaft 2a and has its inner periphery in elastic contact with the outer periphery of the small-diameter portion 4 at the other end of the output shaft 2a.

The sleeve 2b is molded of synthetic resin, and is pressed onto the outer shaft 2a. The seal 6 is formed with an annular projection 7 on its inner periphery at its end facing the seal 6.

The annular projection 7 is axially immovably fixed between a shoulder 8 formed on the outer periphery of the output shaft 2a near its other end and a snap ring 9 fixed on the outer periphery of the small-diameter portion 4 of the output shaft 2a.

The sleeve 2b is formed with a pair of flanges 10 and 11 on its outer periphery at its both ends. The space between the pair of the flanges 10 and 11 serves as a grease reservoir. The flanges 10 and 11 have different outer diameters. The large-diameter flange 10, which is located near the seal 6, has a slightly smaller diameter than the inner diameter of the pulley 1. The outer peripheral surface of the large-diameter flange 10 serves as a radial bearing surface 12 for supporting the pulley 1 so as to be rotatable relative to the output shaft 2a.

The small-diameter flange 11, which is located near the bearing 5, has a larger width than the large-diameter flange 10. As shown in FIG. 2, the small-diameter flange 11 is formed with a pair of diametrically opposed recesses 13 in its side facing the bearing 5. The output shaft 2a is formed with a pair of diametrically opposed projections 14a and 14b on its outer periphery at its end near the bearing 5. The projections 14a and 14b fit in the recesses 13, thereby preventing the sleeve 2b from rotating relative to the output shaft 2a.

The pair of projections 14a and 14b have different lengths. The longer projection 14a has its outer periphery disposed radially outwardly of the outer periphery of the small-diameter flange 11 and located adjacent to the inner periphery of the pulley 1.

A cutout 15 is formed in the outer periphery of the small-diameter flange 11 to extend circumferentially from the recess 13 in which the longer projection 14a fits.

As shown in FIG. 1, a cylindrical clutch surface 16 is formed on the inner periphery of the pulley 1 between the bearing 5 and the seal 6, and a cylindrical clutch spring 17 is mounted inside the clutch surface 16.

The clutch spring 17 is a coil spring made from a wire having a square section. In the unstressed state, the clutch spring 17 has a larger diameter than the small-diameter portion of the clutch surface 16, and is mounted in the pulley 1 in a compressed state with the outer periphery of its portion near the seal in elastic contact with the clutch surface 16.

As shown in FIGS. 1 to 3, a projection 19 for torque transmission is in engagement with the end of the clutch spring 17 near the bearing 5. The projection 19 is engaged in the cutout 15, which is formed in the outer periphery of the sleeve 2b. With this arrangement, the end of the clutch spring 17 near the bearing 5 serves as a torque transmission end through which torque is transmitted to the pulley hub 2. Its other end is a free end. The outer periphery of the free end is in elastic contact with the cylindrical clutch surface 16. Thus, the output member and the clutch spring are rotatable indefinitely other than when the clutch spring is radially expanded by contact with the clutch surface to press against the clutch surface, as discussed below.

One side surface of the projection 14a facing the leading end surface of the projection 19 for torque transmission is a tapered surface 20. The leading end surface of the projection 19 is also a tapered surface 21 complementary to the tapered surface 20.

As shown in FIG. 3, the end of the clutch spring 17 is brought into engagement with the projection 19 by engaging an L-shaped engaging piece 23 at the end of the clutch spring 17 in an L-shaped recess 22 formed in the top surface of the projection 19.

As shown in FIG. 1, the clutch surface 16 is formed with a large-diameter recess 24 at a position opposite to the end portion of the clutch spring 17 including the torque transmission end.

As shown in FIG. 1, a positioning ring 26 is provided between the single-seal bearing 5 and a shoulder 25 formed at the end of the output shaft 2a on its outer periphery. The positioning ring 26 has on its outer periphery a positioning piece 27 which abuts the side of the torque transmission projection 19. The clutch spring 17 is axially positioned by the positioning piece 27 and the large-diameter flange 10 of the sleeve 2b.

The pulley hub 2 is mounted on a rotary shaft of e.g. an alternator as an engine accessory so that they will not rotate relative to each other. Then, a belt is trained about the pulley 1 and the pulley on the crankshaft to transmit the rotation of the crankshaft to the pulley 1 through the belt.

In this state, when the rotation of the crankshaft is transmitted to the pulley 1 and the pulley 1 rotates in the direction shown by the arrow in FIG. 2, the clutch spring 17 radially expands by contact with the clutch surface 16 and is pressed against the clutch surface 16.

At this time, because the clutch surface 16 is formed with the large-diameter recess 24 at a position opposite to the end portion of the clutch spring 17 including the torque transmission end, several turns of the clutch spring 17 at this end portion radially expand but are not pressed against the inner periphery of the large-diameter recess 24.

Also, with the expansion of the clutch spring 17, the torque transmission projection 19 at the end of the clutch spring 17 smoothly slides radially outwardly along the tapered surface 20 of the projection 14a, so that torque is transmitted to the projection 14a and the pulley hub 2 rotates in the same direction as the pulley 1. As described above, the torque transmission projection 19 moves neither axially nor circumferentially, relative to the clutch spring 17. They do not move radially relative to each other, either.

As described above, in transmitting torque from the pulley 1 to the pulley hub 2, only several turns of the clutch spring 17 at its portion including the torque transmission end radially expand without being pressed against the inner periphery of the large-diameter recess 24. Therefore, sharp torque input produced at the clutch is relaxed and no breakage of the clutch spring 17 will occur. Thus a highly durable spring clutch is provided.

Although in the embodiment of FIG. 1, the single large-diameter recess 24 is provided in the clutch surface 16 at a position opposite to the end portion of the clutch spring 17 including the torque transmission end, the position and number of such large-diameter recesses 24 are not limited, but a plurality of axially spaced apart large-diameter recesses 24 may be formed.

While torque is being transmitted from the pulley 1 to the pulley hub 2, when the speed of the pulley hub 2 exceeds the speed of the pulley 1, the torque transmission projection 19 engages the end wall of the cutout 15 and the turn 17a of the clutch spring 17 at its leading end is dragged and moves radially inwardly of the sleeve 2b by its own restoring elasticity away from the clutch surface 16. Thus the clutch spring 17 is radially compressed and slips on the contact surface with the clutch surface 16. Now the pulley 1 rotates freely and the transmission of rotation from the pulley 1 to the pulley hub 2 is cut off.

Even when the speed of the pulley hub 2 exceeds the speed of the pulley 1, because the torque transmission projection 19 is in engagement with the end wall of the cutout 15, projection 19 is kept close to the projection 14a. Thus, when the speed of the pulley 1 exceeds the speed of the pulley hub 2, the projection 19 is instantly presses against the tapered surface 20 of the projection 14a, so that torque can be transmitted to the pulley hub 2 without delay.

Figure 4:
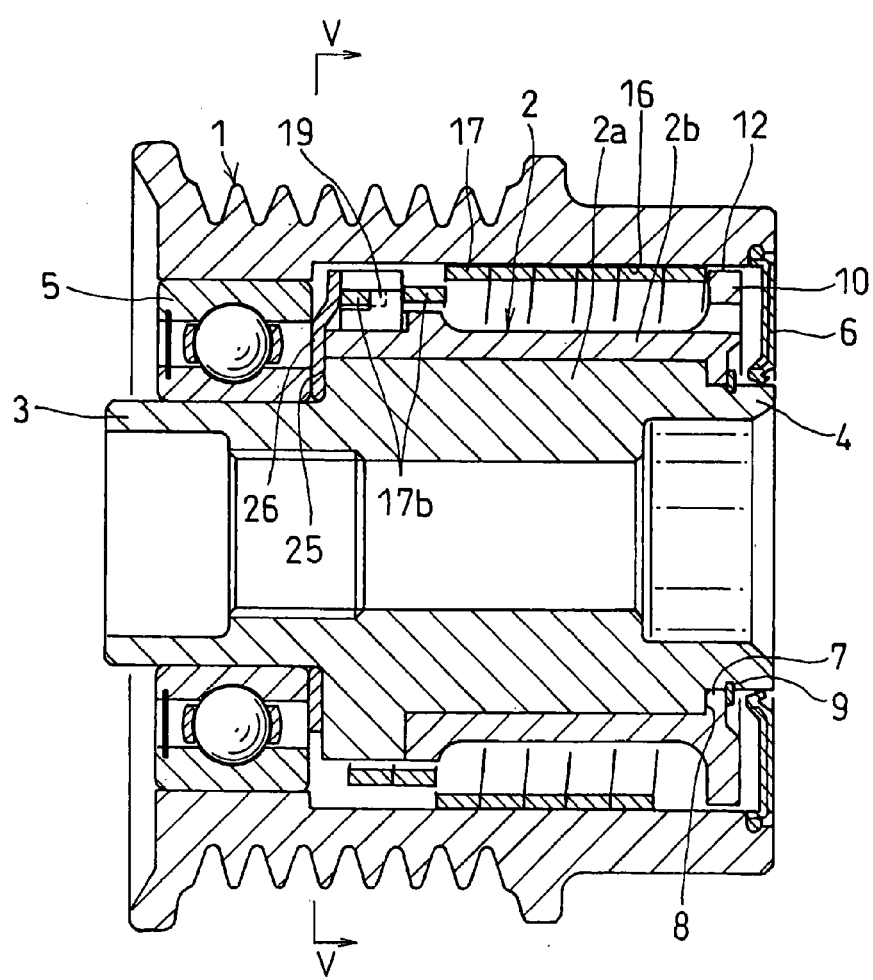
FIG. 4 is a vertical sectional front view of a spring clutch according to a second embodiment of the present invention.
Figure 5:
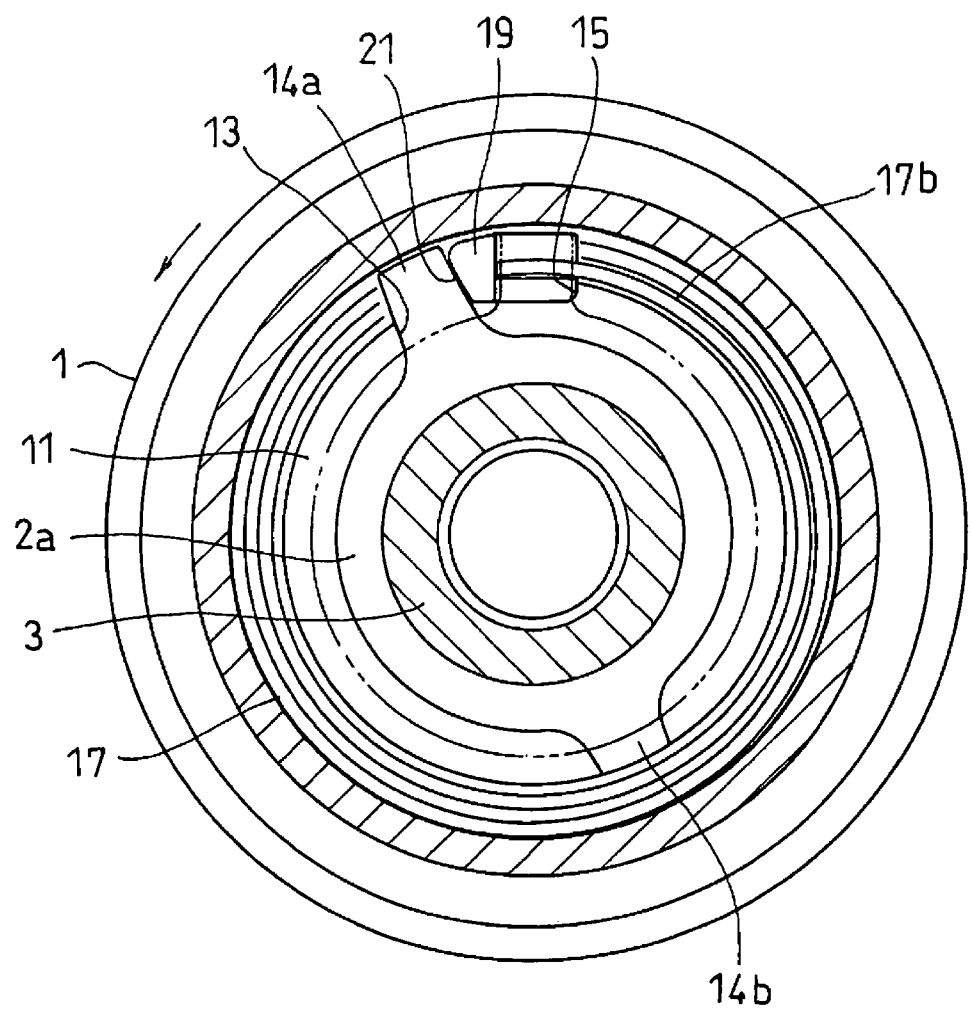
FIG. 5 is a sectional view taken along line V-V of FIG. 4.

FIGS. 4 and 5 show a spring clutch according to the second embodiment of this invention. In this embodiment, the large-diameter recess 24 of FIG. 1 is omitted and the clutch surface 16 is cylindrical with a uniform diameter over its entire axial length. Also, this embodiment differs from the first embodiment in that the clutch spring 17 is provided with a small-diameter portion 17b at its portion including the torque transmission end. Thus, elements identical to those of the first embodiment are denoted by identical numerals and their description is omitted.

With this arrangement, in transmitting torque by the expansion of the clutch spring 17, the small-diameter coil portion 17b only radially expands and is not pressed against the clutch surface 16. Thus, like the spring clutch of FIG. 1, sharp torque input produced by the clutch is relaxed, so that breakage of the clutch spring 17 is prevented and thus the durability of the clutch can be improved.

Although in FIG. 4, the clutch spring 17 is provided with the single small-diameter portion 17b at its portion including the torque transmission end, the position and number of such small-diameter portions 17b are not limited. For example, a plurality of axially spaced apart small-diameter portions 17b may be formed.

Figure 6:
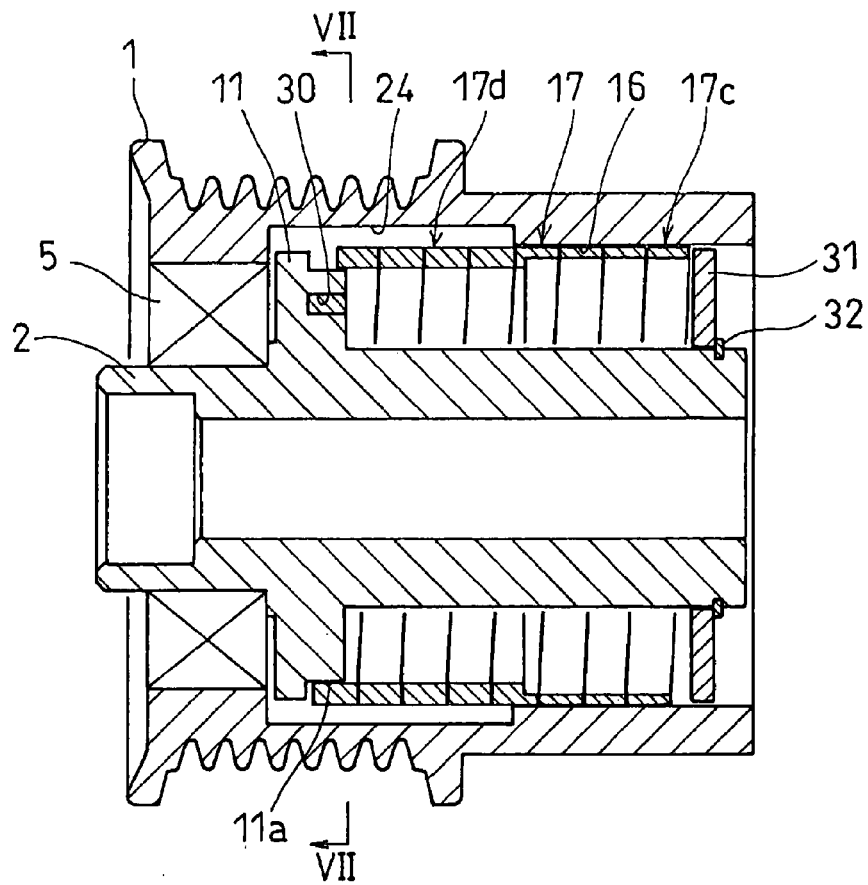
FIG. 6 is a vertical sectional front view of a spring clutch according to a third embodiment of the invention.
Figure 7:
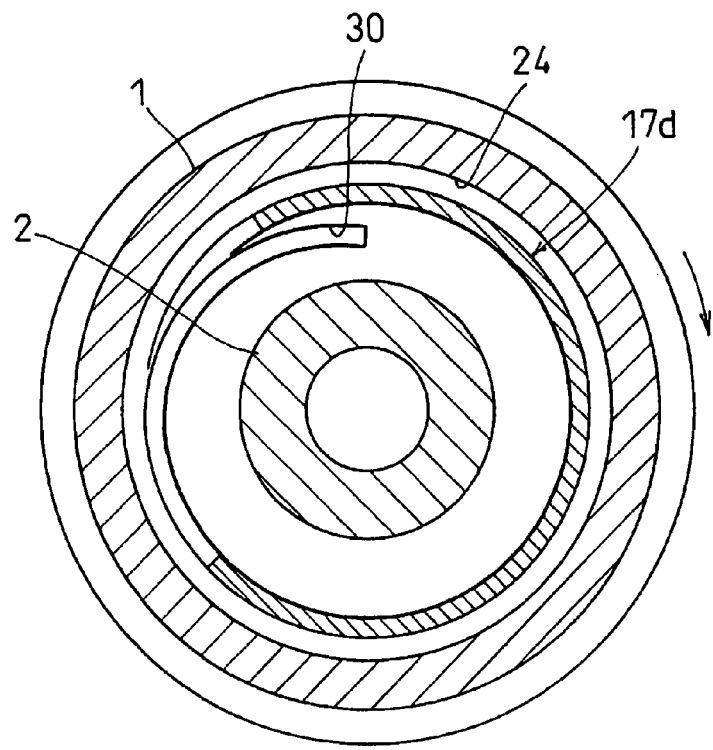
FIG. 7 is a sectional view taken along line VII-VII of FIG. 6.

FIGS. 6 and 7 show a spring clutch according to the third embodiment of this invention. In this embodiment, a pulley 1 as an input member and a pulley hub 2 as an output member are supported by a bearing 5 mounted at one end of the pulley 1 so as to be relatively rotatable. The pulley 1 has a radially inner cylindrical clutch surface 16 which is formed with a large-diameter recess 24 at its end near the bearing 5.

A clutch spring 17 in the form of a coil spring is mounted in a radially compressed state in the pulley 1 and has a clutch portion 17c at a position opposite to the clutch surface 16 which is in elastic contact with the clutch surface 16. The clutch spring 17 has a damper portion 17d at a position opposite to the large-diameter recess 24. The damper portion 17d has its end portion fitted on a small-diameter spring fitting surface 11a formed on a flange 11 provided at one end of the pulley hub 2 and has its extreme end inserted and engaged in a spiral groove 30 opening to the spring fitting surface 11a.

A lock plate 31 fitted at the other end of the pulley hub 2 is prevented from coming off by a snap ring 32. The lock plate 31 and the flange 11 axially position the clutch spring 17. The spring rigidity of the clutch portion 17c of the clutch spring 17 is set to be smaller than that of the damper portion 17d, which is disposed opposite to the large-diameter recess 24.

For setting the spring rigidity as described above, in this embodiment, the clutch portion 17c of the clutch spring 17 is thinner than the damper portion 17d. Such a clutch spring can be easily made by forming a coil spring from a wire having a square section and turning one end portion of the inner periphery of the coil spring.

Figure 8:
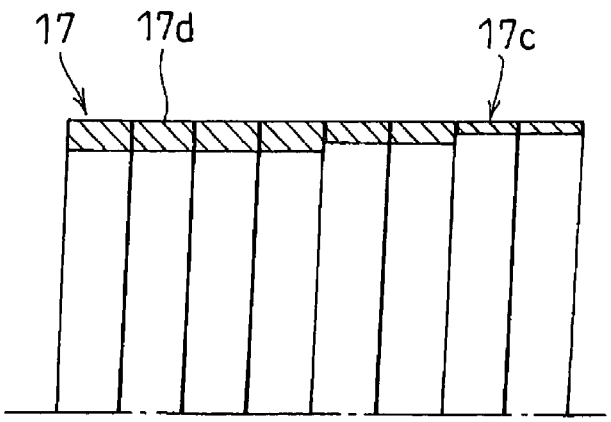
FIG. 8 is a sectional view of a different clutch spring.
Figure 9:
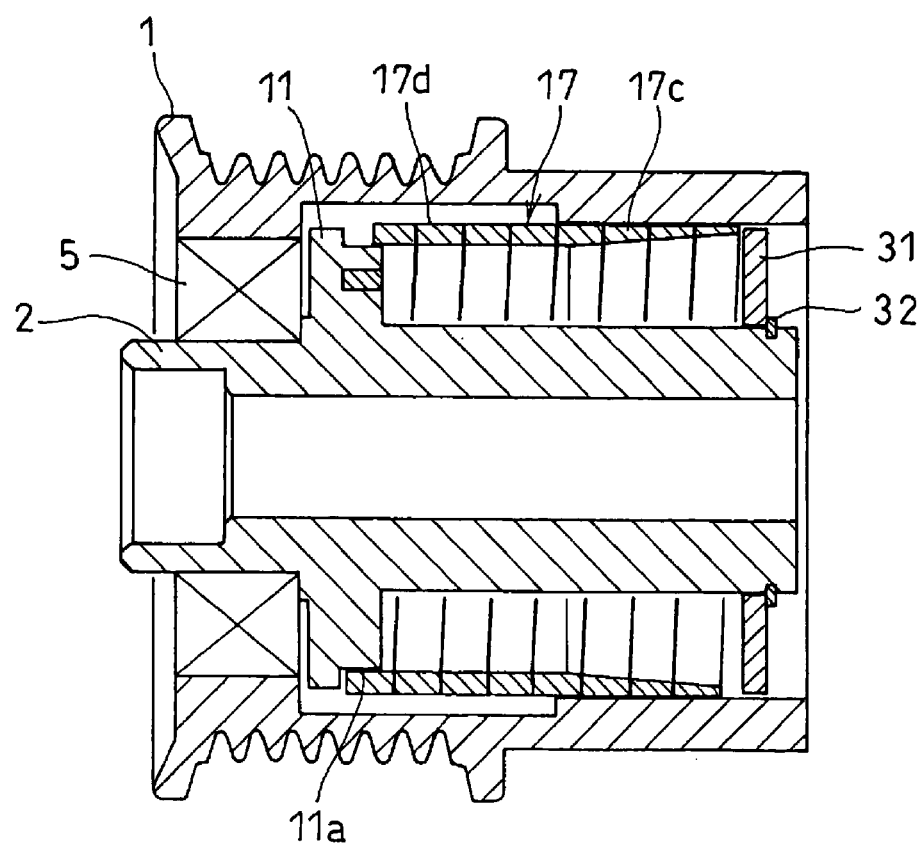
FIG. 9 is a sectional view of a still different clutch spring.

The clutch portion 17c may have a uniform thickness and a uniform spring rigidity over its entire axial length, or may have a thickness increasing in steps toward the damper portion 17d as shown in FIG. 8 so that the spring rigidity changes in steps in the axial direction. Instead, as shown in FIG. 9, clutch portion 17c may have its thickness gradually increasing toward the damper portion 17d so that the spring rigidity continuously changes in the axial direction.

A clutch spring having the clutch portion 17c, of which the spring rigidity is lower than that of the damper portion 17d, can also be made by forming a spring wire having its thickness changing in the length direction into a coil shape.

In this arrangement, when the pulley 1 rotates in the direction shown by the arrow in FIG. 7, the clutch portion 17c of the clutch spring 17 radially expands by contact with the clutch surface 16 and is pressed against the clutch surface 16.

At this time, because the clutch surface 16 is formed with the large-diameter recess 24 at a position opposite to the damper portion 17d, the damper portion 17d only radially expands without being pressed against the inner periphery of the large-diameter recess 24.

The expansion of the clutch portion 17c increases a pressed contact engaging force against the clutch surface 16, so that the clutch spring 17 rotates together with the pulley 1. Thus, the torque of the pulley 1 is transmitted through the one end of the clutch spring 17 to the pulley hub 2, so that the pulley hub 2 rotates in the same direction as the pulley 1.

While torque is being transmitted from the pulley 1 to the pulley hub 2, because the damper portion 17d only radially expands without being pressed against the inner periphery of the large-diameter recess 24, elastic deformation by expansion of the damper portion 17d relaxes sharp torque input produced by the clutch. Therefore, it is not probable that the clutch spring 17 will bend at the damper portion 17d with stress concentrating there. Thus a highly durable spring clutch can be provided.

By making the spring rigidity of the clutch portion 17c lower than that of the damper portion 17d, adherence to the clutch surface 16 increases, and the clutch portion 17c is radially expanded and compressed with small torque. This improves response of the spring clutch.

Figure 10:
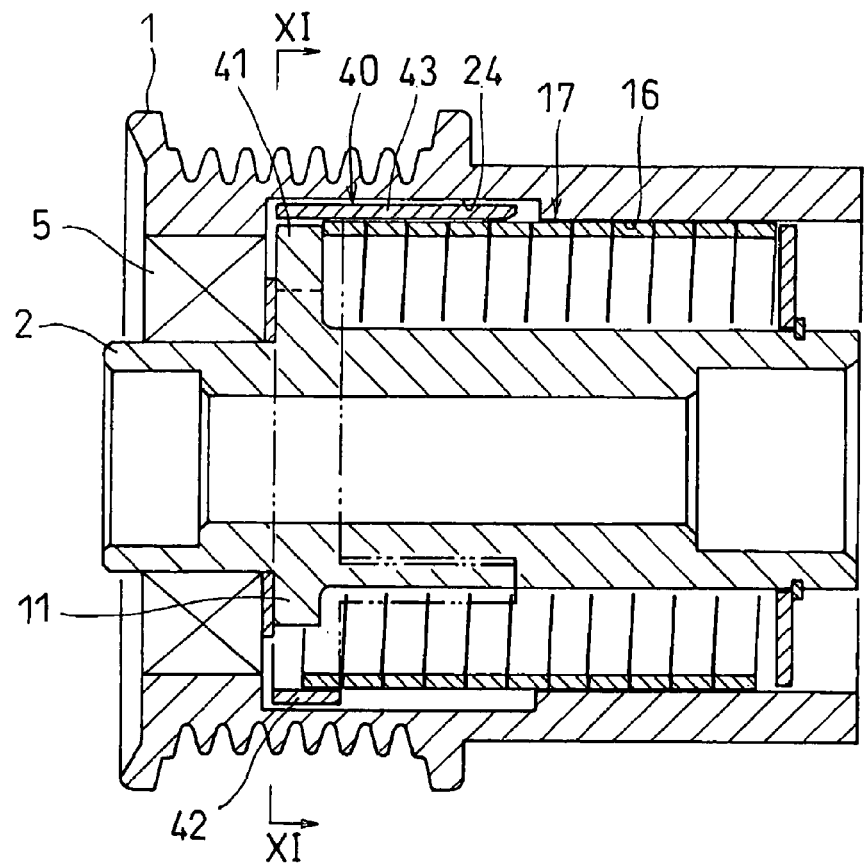
FIG. 10 is a vertical sectional front view of a spring clutch according to a fourth embodiment of the invention.
Figure 11:
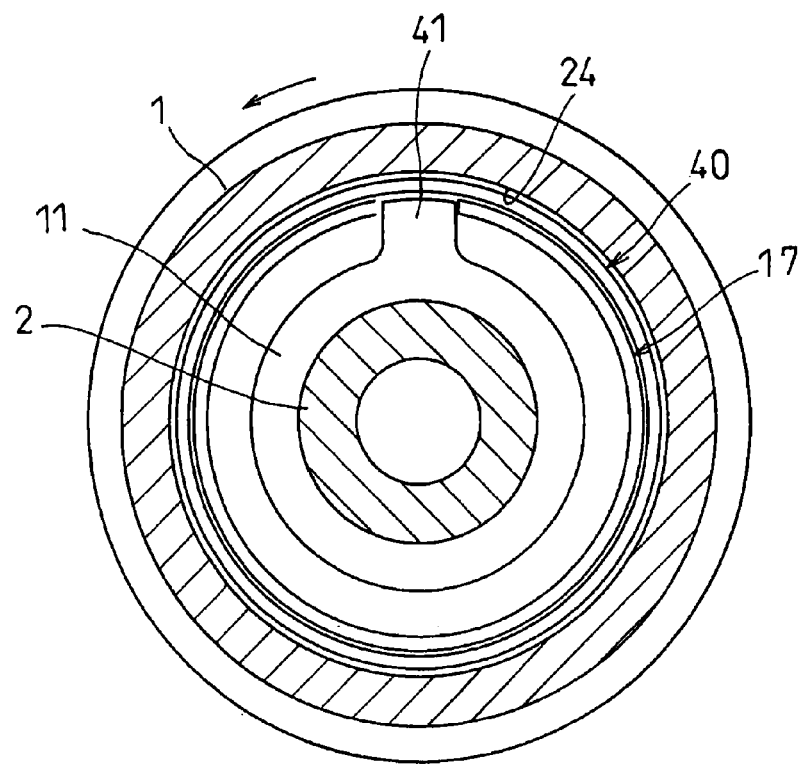
FIG. 11 is a sectional view taken along line XI-XI of FIG. 10.
Figure 12:
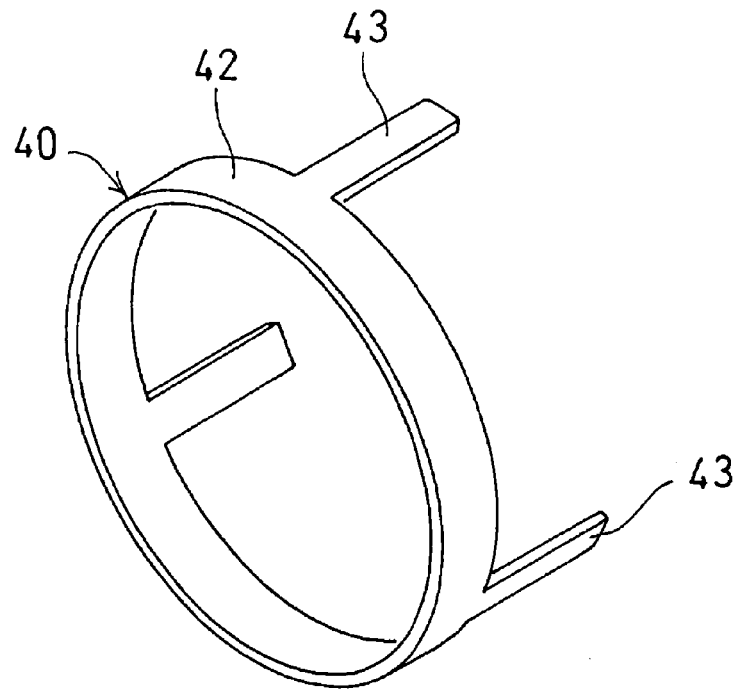
FIG. 12 is a perspective view of a cover ring.

FIGS. 10 to 12 show a spring clutch according to the fourth embodiment of the present invention. This embodiment differs from the third embodiment in that the clutch spring 17 has a uniform thickness over the entire length and has its portion including the torque transmission end covered by a cover ring 40 mounted in the large-diameter recess 24, and that a flange 11 formed at one end of the pulley hub 2 is formed with a projection 41 which circumferentially opposes the torque transmission end of the clutch spring 17, and through which torque is transmitted. Thus, elements identical to those of the third embodiment are denoted by identical numerals and their description is omitted.

As shown in FIGS. 10 and 12, the cover ring 40 comprises an annular portion 42 covering the torque transmission end of the clutch spring 17 and a plurality of hold-down claws 43 extending axially from one end of the annular portion 42 for restricting radial expansion of the clutch spring 17 with sufficient spaces left between the adjacent hold-down claws to allow elastic deformation of the clutch spring 17.

By providing the cover ring 40 in the large-diameter recess 24 so as to cover the end portion of the clutch spring 17 including the torque transmission end, it is possible to increase the spring rigidity of this portion of the clutch spring 17. This makes it possible to adopt as the clutch spring 17 one made from a spring material which is thin, apt to deform elastically and has good adherence to the clutch surface 16, thereby improving the operability of the spring clutch.

When the clutch spring 17 radially expands and engages the clutch surface 16, the several turns of clutch spring 17 at its portion including the torque transmission end are prevented from expanding at their portions opposite to the hold-down claws 43 of the cover ring 40, so that their spring rigidity increases. The several turns of the clutch spring elastically deform so as to bulge radially outwardly at their portions opposite to the spaces between the hold-down claws, thereby relieving sharp torque input produced by the clutch.

Therefore, no breakage of the clutch spring 17 will occur and a highly durable spring clutch can be obtained.

Figure 13:
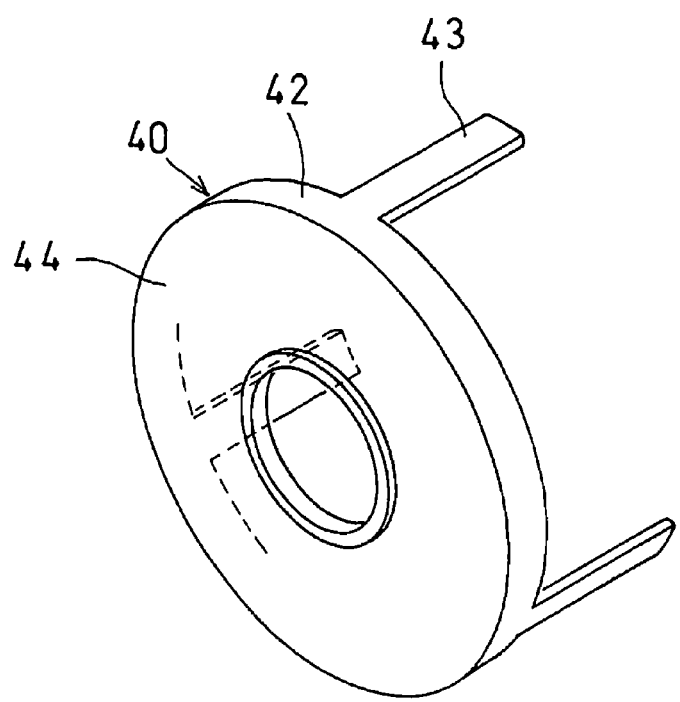
FIG. 13 is a perspective view of a different cover ring.

As shown in FIG. 13, by forming a radially inwardly extending flange 44 on the other side of the annular portion 42, the cover ring 40 is prevented from axially moving and producing noise because the flange 44 is axially positioned by the flange 11 shown in FIG. 10 and the bearing 5.

Figure 14:
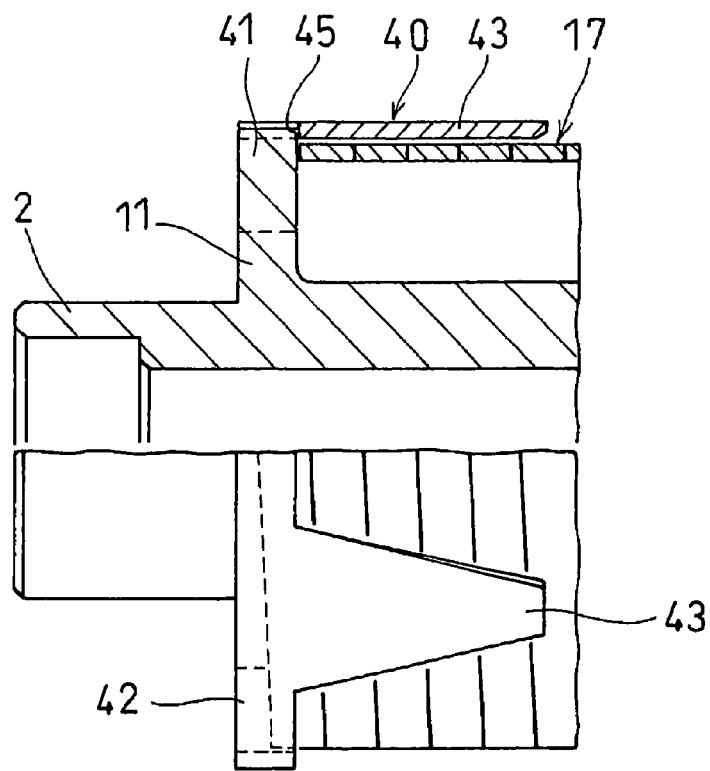
FIG. 14 is a partial sectional view of the spring clutch, showing how the cover ring is prevented from rotating relative to the pulley hub.
Figure 15:
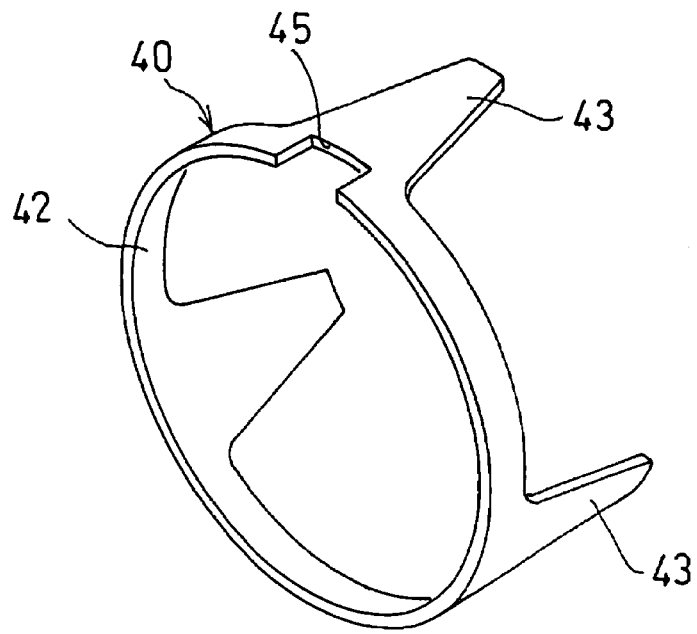
FIG. 15 is a perspective view of the cover ring shown in FIG. 14.

As shown in FIGS. 14 and 15, the hold-down claws 43 may be V shaped having a width increasing toward the annular portion 42. With this arrangement, the spaces between the claws 43 are the largest at their tip and decrease gradually toward the annular portion 42. Thus, the amount of deformation of the clutch spring 17 between the adjacent claws 43 becomes smaller toward the torque transmission end of the clutch spring 17.

This arrangement makes it possible to increase the spring rigidity of the clutch spring 17 gradually toward the torque transmission end, prevent the breakage of the clutch spring effectively and relax the torque input loaded.

Further, as shown in FIGS. 14 and 15, by forming the annular portion 42 with a cutout 45 to receive the projection 41, the cover ring 40 can be prevented from turning relative to the pulley hub 2, thereby preventing the cover ring 40 from rotating freely and producing noise.

Figure 16:
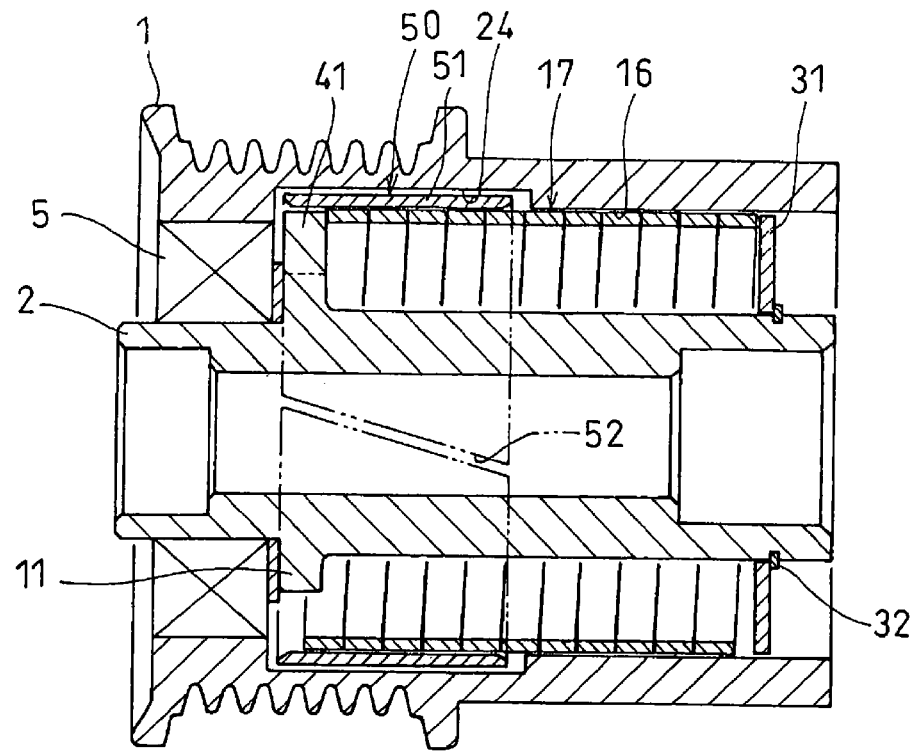
FIG. 16 is a vertical sectional front view of a spring clutch according to a fifth embodiment of the invention.
Figure 17:
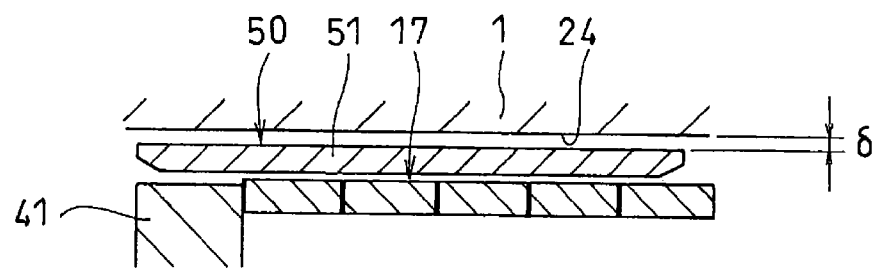
FIG. 17 is a partial enlarged sectional view of the spring clutch of FIG. 16, showing how an elastic ring is mounted.
Figure 18:
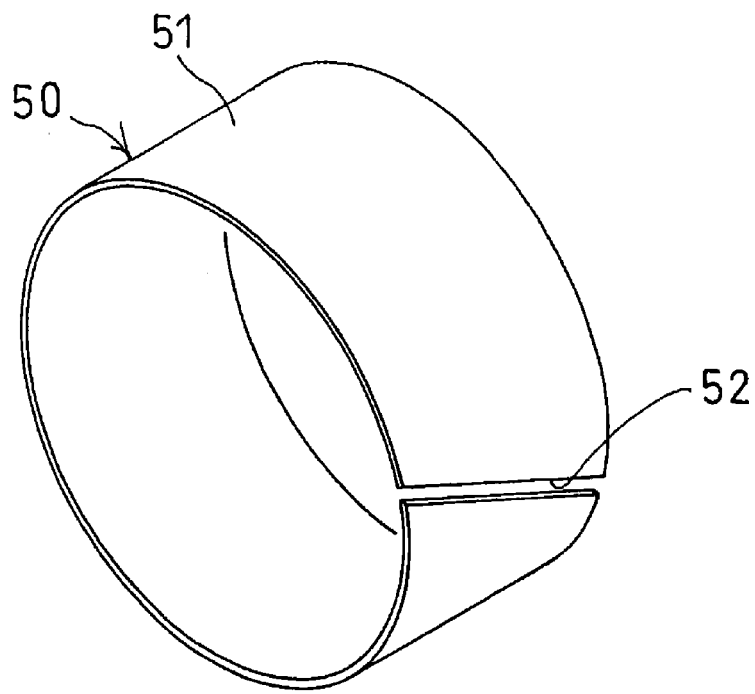
FIG. 18 is a perspective view of an elastic ring.

FIGS. 16 to 18 show a spring clutch according to the fifth embodiment of the invention. In this embodiment, an elastic ring 50 is mounted in place of the cover ring 40 to supplement the spring rigidity of the portion of the clutch spring 17 near the torque transmission end.

The elastic ring 50 is formed with a cut 52 at a portion of the circumference of a cylindrical member 51. As shown in FIG. 17, between the elastic ring 50 and the large-diameter recess 24, there is formed a gap 6 of such a size that even if the pulley 1 is loaded with the maximum design torque (that is, maximum allowable torque to the spring clutch) and the elastic ring 50 expands, the outer periphery of the elastic ring 50 does not contact the inner periphery of the large-diameter recess 24.

As shown in the fifth embodiment, by mounting the elastic ring 50 at the portion of the clutch spring 17 including the torque transmission end, the spring rigidity of this portion of the clutch spring 17 increases. This makes it possible to adopt as the clutch spring 17 one made from a spring material which is thin, apt to deform elastically and has good adherence to the clutch surface 16, thereby improving the operability of the spring clutch.

Also, because the elastic ring 50 supplements the spring rigidity of the portion of the clutch spring 17 including the torque transmission end, it is possible to suppress the formation of a bend at this portion of the clutch spring 17 in transmitting torque by the expansion of the clutch spring 17. Therefore, the clutch spring 17 will hardly break due to fatigue and a highly durable spring clutch can be obtained.

When the clutch spring 17 radially expands and engages the clutch surface 16, the torque output end of the clutch spring 17 expands into close contact with the inner periphery of the elastic ring 50. As the amount of its expansion increases, the elastic ring 50 expands. The elastic deformation by the expansion of the end portion of the clutch spring 17 including the torque transmission end and the expansion of the elastic ring 50 relaxes sharp torque input produced by the clutch and effectively prevents the formation of a bend on the clutch spring 17. This prevents breakage of the clutch spring 17 and the pulley hub 2.

Figure 19:
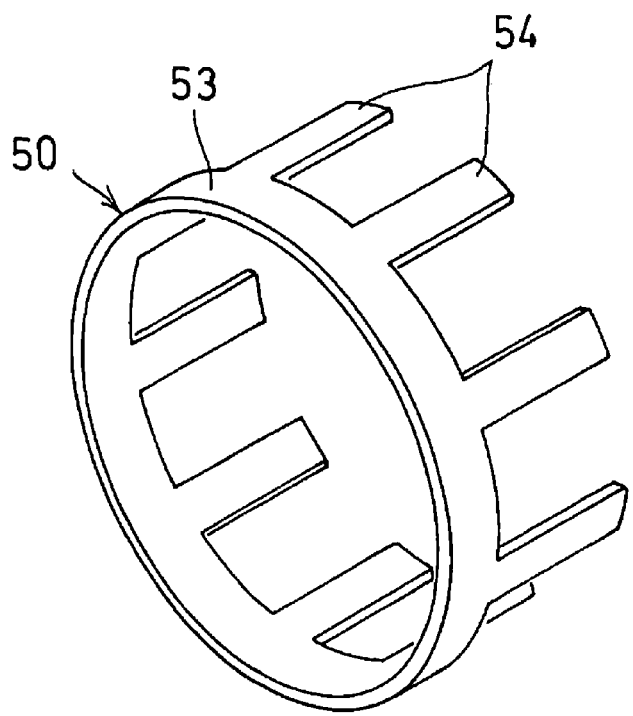
FIG. 19 is a perspective view of a different elastic ring.
Figure 20:
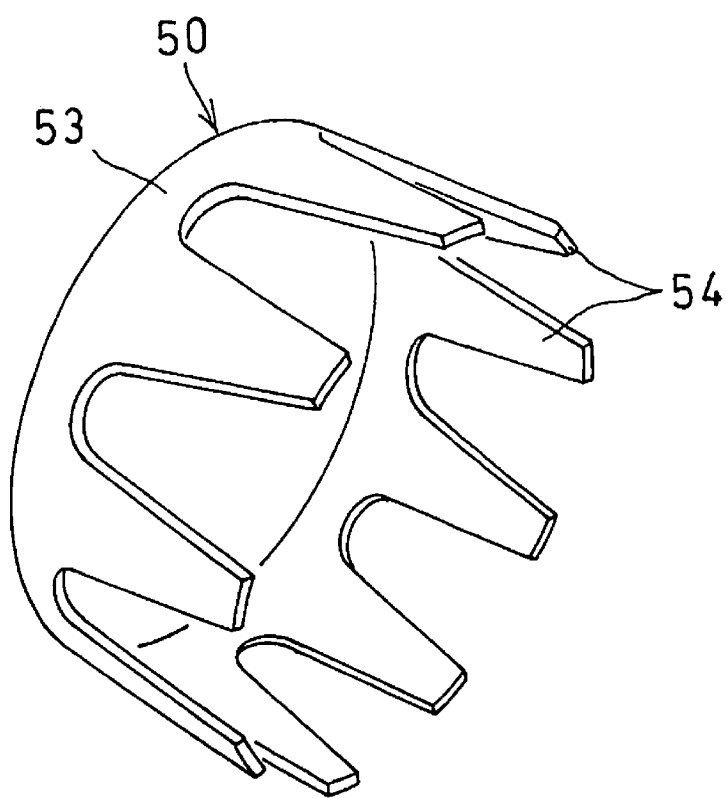
FIG. 20 is a perspective view of a still different elastic ring.

As shown in FIG. 19, the elastic ring 50 may have a plurality of elastic legs 54 extending integrally from one end of an annular portion 53 so as to be circumferentially spaced apart from each other. As shown in FIG. 20, the elastic legs 54 may have their width decreasing gradually toward their tip so that their spring rigidity increases gradually toward the annular portion 53. This gives a spring rigidity corresponding to the expansion force to the end portion of the clutch spring 17 including the torque transmission end.

Preferably, the elastic ring 50 shown in any of FIGS. 18 to 20 has a cutout to receive the projection 41 formed on the flange 11, like the embodiment shown in FIGS. 14 and 15, thereby preventing the ring 50 from rotating relative to the pulley hub 2 and producing noise.

Figure 21:
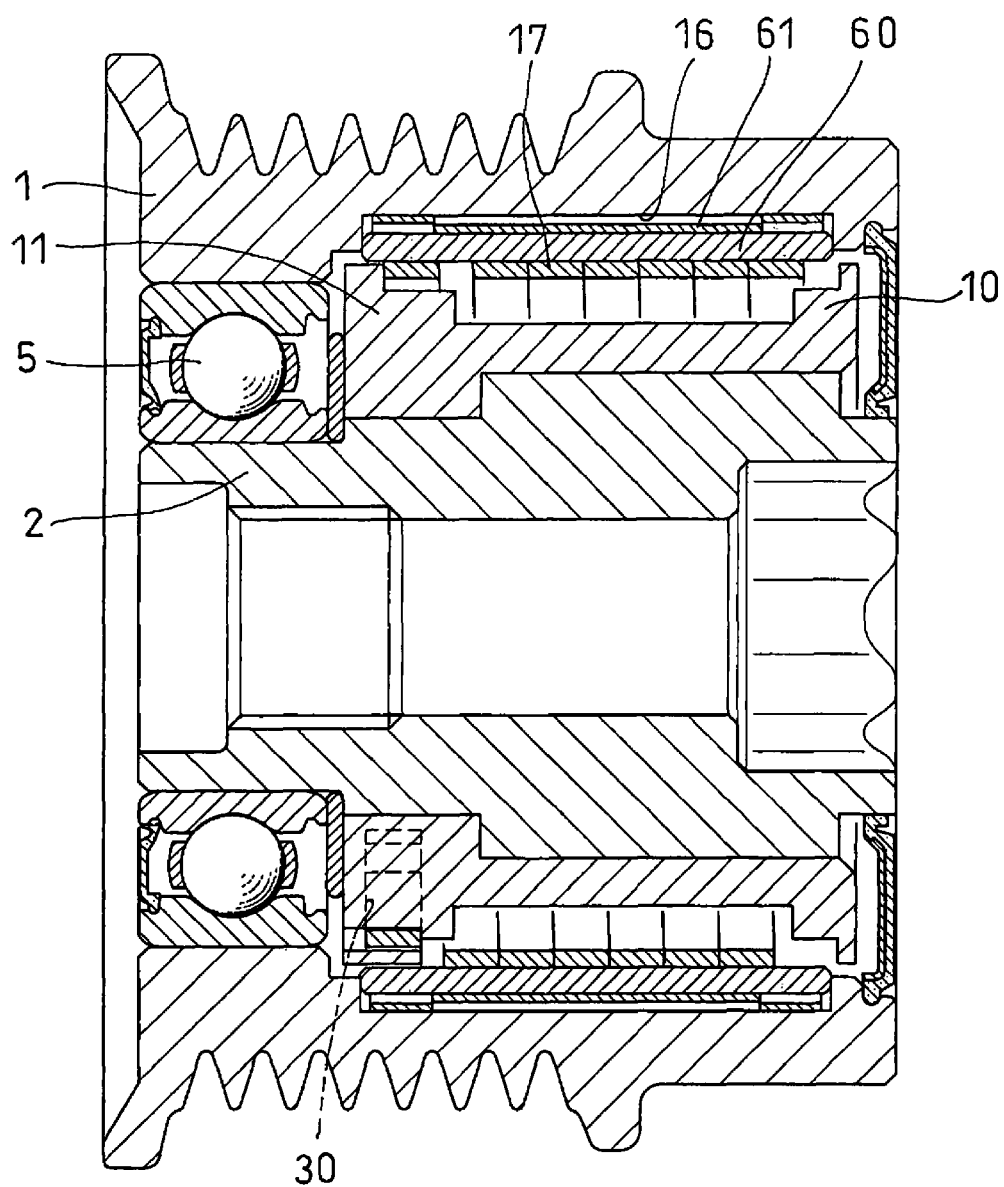
FIG. 21 is a vertical sectional front view of a spring clutch according to a sixth embodiment of the invention.
Figure 22:
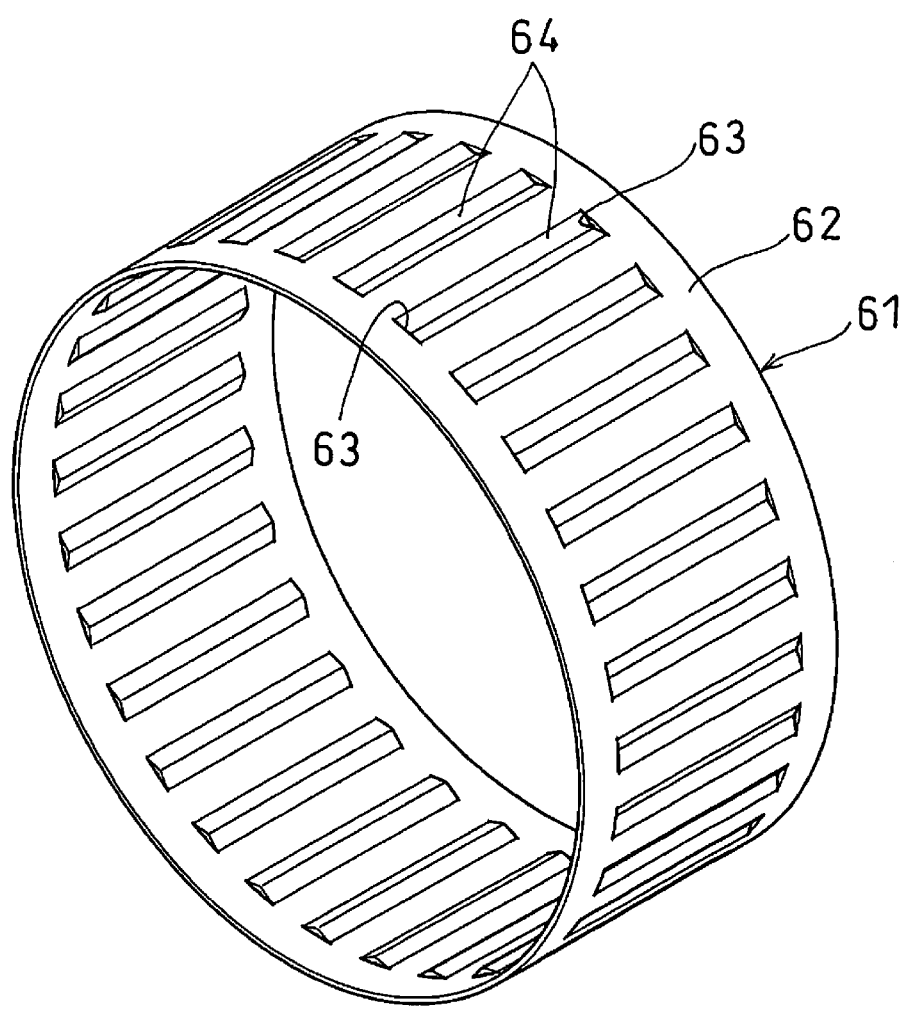
FIG. 22 is a perspective view of an elastic member.

FIGS. 21 and 22 show a spring clutch according to the sixth embodiment of the invention. In this embodiment, a ring member 60 is mounted between the clutch surface 16 formed on the inner periphery of the pulley 1 and the clutch spring 17 mounted in the pulley 1 so that the clutch spring 17 is brought into elastic contact with the ring member 60. A cylindrical elastic member 61 is mounted between the ring member 60 and the clutch surface 16 so as to be brought into elastic contact with both the outer periphery of the ring member 60 and the clutch surface 16.

As shown in FIG. 22, the elastic member 61 is a thin cylindrical body 62 made of a metal and formed with a plurality of opposed pairs of cuts 63 arranged circumferentially at equal intervals. A plurality of elastic protrusions 64 are formed by radially inwardly bulging the portions between the respective pairs of cuts 63.

The clutch spring 17 has a uniform diameter over the entire axial length and has its one end inserted and engaged in a spiral groove 30 formed in the flange 11 like the arrangement shown in FIG. 6.

Otherwise, this embodiment is the same as the second embodiment shown in FIG. 4. Thus, identical parts are denoted by identical numerals and their description is omitted.

In the sixth embodiment, by providing the ring member 60 between the clutch surface 16 and the clutch spring 17 so as to be brought into elastic contact with the clutch spring 17, it is possible to make uniform the radial force of the clutch spring 17 and ensure stable transmission of torque.

By providing the cylindrical elastic member 61 between the ring member 60, which is a rigid body, and the clutch surface 16 so as to be brought into elastic contact with the outer periphery of the ring member 60 and the clutch surface 16, if an excessive torque (shock torque) over the transmittable torque capacity is loaded by friction between the ring member 60 and the elastic member 61, slip occurs at the contact point between the ring member 60 and the elastic member 61, so that torque transmission to the clutch spring 17 is cut off. This prevents stress concentration to the end portion of the clutch spring 17 including the torque transmission end and thus its breakage. Thus, a highly durable spring clutch is provided.

As shown in FIG. 23A, the ring member 60 may be formed with an axial cut 65 or, as shown in FIG. 23B, it may be formed with a plurality of slits 66 extending axially from one end thereof so as to be elastically deformable. This increases the percentage of absorption of excessive torque by elastic deformation of both the ring member 60 and the elastic member 61. Thus, an excessive torque can be absorbed more effectively in comparison with the arrangement in which it is absorbed by elastic deformation of the elastic member 61 only.

What is claimed is:

1. A spring clutch comprising:
an input member having a cylindrical clutch surface on its inner periphery;
an output member mounted in said input member so as to be rotatable relative to said input member; and
a cylindrical clutch spring mounted between said input member and said output member and including a torque transmission end through which torque is transmitted to said output member;
wherein said input member, said output member, and said clutch spring are arranged such that, when said input member rotates in one direction, said clutch spring radially expands by contact with said clutch surface, thereby transmitting torque from said input member to said output member, and when the speed of said output member exceeds the speed of said input member, said clutch spring is radially compressed, thereby cutting off the transmission of torque from said input member to said output member;
wherein said clutch surface is formed with at least one large-diameter recess to allow radial expansion of several turns of said clutch spring;
wherein said input member is configured and arranged so as to be rotated by a turning torque of a driving source, other than said output member, that is external to said spring clutch; and
wherein said torque transmission end of said clutch spring is in engagement with said output member, and an end of said clutch spring opposite said torque transmission end constitutes a free end such that said clutch spring is not positively fixed for rotation with a member that is rotatable relative to said output member, whereby said output member and said clutch spring are rotatable indefinitely other than when said clutch spring is radially expanded by contact with said clutch surface.

2. The spring clutch of claim 1 wherein said large-diameter recess is formed only at a position opposite to an end portion of said clutch spring including said torque transmission end.

3. The spring clutch of claim 1 wherein said large-diameter recess is formed at a position opposite to an end portion of said clutch spring including said torque transmission end.

4. The spring clutch of claim 1 wherein
a projection is provided at said torque transmission end of said clutch spring;
a radially outwardly projecting flange is provided so as to rotate together with said output member;
a cutout is formed in said radially outwardly projecting flange; and
said projection provided at said torque transmission end of said clutch spring is engaged in said cutout.

5. The spring clutch of claim 4, further comprising
a rotary output shaft, said output member being fitted on an outer periphery of said rotary output shaft and fixed for rotation therewith;
wherein said radially outwardly projecting flange is formed as an integral part of said output member.

6. The spring clutch of claim 1, further comprising
a rotary output shaft, said output member being fitted on an outer periphery of said rotary output shaft and fixed for rotation therewith.

* * * * *